UNITED STATES PATENT OFFICE.

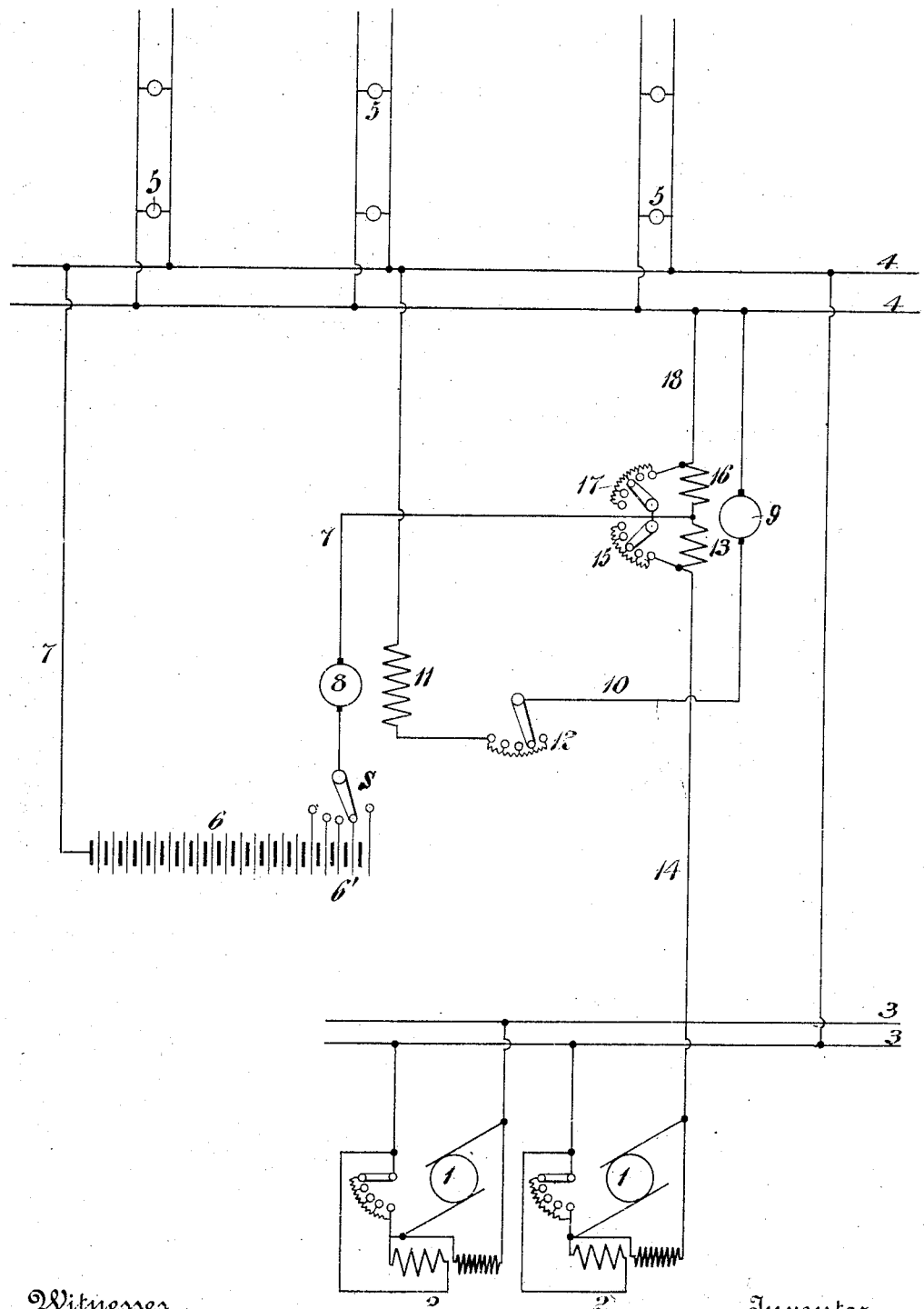

ALBERT S. HUBBARD, OF GREENWICH, CONNECTICUT, ASSIGNOR TO GOULD STORAGE BATTERY COMPANY, A CORPORATION OF NEW YORK.

SYSTEM OF ELECTRICAL DISTRIBUTION.

No. 858,720.  Specification of Letters Patent.  Patented July 2, 1907.

Application filed February 21, 1903. Serial No. 144,482.

*To all whom it may concern:*

Be it known that I, ALBERT S. HUBBARD, a citizen of the United States, residing at Greenwich, in the county of Fairfield and State of Connecticut, have invented certain new and useful Improvements in Systems of Electrical Distribution, of which the following is a specification.

This invention relates to improvements in systems of distribution, and particularly to a generating, storing and distributing system involving the use of a storage battery and booster, particularly those systems employing devices to act on the booster field winding to vary the strength of the same in accordance with the load on the generator. Such booster regulating devices may be a motor or counter-electromotive force generator similar to that shown and described in Letters Patent No. 651,664 issued to me on June 12, 1900.

In a system such as is described in said Letters Patent No. 651,664 the size of the counter E. M. F. generator increases in accordance with the fineness of regulation desired. Consequently in installations requiring fine load regulations the size of the counter E. M. F. machine becomes undesirably large.

The object of the present invention is to enable fine load regulation to be obtained without increasing the size of the counter E. M. F. generator.

The accompanying drawing represents a system or installation embodying my invention.

In said drawing:—1, 1, represent the dynamos with compounding field magnets 2, the said dynamos being connected to the bus-bars 3, 3.

4, 4, represent mains for the work circuit, which includes the translating devices 5 for lighting, heating, power, etc. The storage battery 6 with its regulating or "end" cells 6' is connected across the mains 4, 4, in a circuit 7, including the armature 8 of the booster, the counter E. M. F. generator field-coil 16 and the connection 18. The booster armature is driven at approximately constant speed by suitable means. A motor or counter-electromotive force generator, also connected to run at substantially constant speed, has its armature 9 connected in a circuit 10, which includes the field magnet 11 of the booster and a regulating rheostat 12. The field magnet of said motor or counter E. M. F. generator, including the two coils 13 and 16, which operate cumulatively, is connected in series with the load, being included for example in a connection 14 and 18 between a dynamo bus-bar 3 and the corresponding side 4 of the consumption circuit. The strength of this field magnet is controlled by regulatable shunt rheostats 15 and 17. That portion of the circuit from the generators through connection 14 to the point between the fields 13 and 16 is the generator circuit. The circuit from the point between the fields 13 and 16 to and through the mains 4—4 is the work circuit. The battery circuit is from the battery through the booster and connection 7 to the mains 4—4.

In the normal operation of the system the electromotive force furnished by the booster, as adjusted by rheostat 12 and the counter-electromotive force generator 9, is just about sufficient to balance the difference between the line electromotive force and the battery electromotive force. The battery electromotive force may be greater than, equal to or less than the electromotive force of the line, the electromotive force of the booster being adjusted to cause the battery to be neutral under normal conditions of load. With the ordinary dynamo any increase of load will result in a corresponding relative difference of electromotive force between the battery and the dynamos, and the tendency of this difference of electromotive force would be to prevent the battery feeding to the line. Owing, however, to the opposing effect of the counter-electromotive force generator 9 the electromotive force applied to the battery circuit will be correspondingly modified, thus permitting the battery to feed back to the line and assume a part of the extra load. This effect of the counter-electromotive force generator is due to the fact that its strength of field is responsive to the load, its field magnet being in series with the consumption circuit, so that as the load increases the counter electromotive force increases and the magnetization of the booster field is correspondingly changed.

The function of the two coils on the field of the counter E. M. F. machine are as follows: Assuming the apparatus to be adjusted as described so that with the normal load in amperes passing through the coils 13 and 16, the battery and booster combination is "floating"; that is, the battery neither charges nor discharges. In this case increases of current through coil 16 cause the battery to discharge to the line, while decreases of current in the same coil cause the battery to charge, the function of coil 13 being merely to limit the charging of the battery at periods of light external loads to a maximum equal to the generator load for which the apparatus was set.

The field regulating devices for the counter-electromotive force generator may be of any suitable form, whether of the rheostatic or the multiple field coil type.

In order to illustrate the operation of the system under different conditions of load and different relations of the battery electromotive force to the line electromotive force, the following examples are given, it being distinctly understood that these examples are only illustrative and are not intended to limit the scope of the invention to any particular arrangement or relation between the features of the system.

The following conditions are the same for each example or case.

Voltage on 4—4 . . . . . . . . . 500 volts.
Minimum load on 4—4 . . . . . 0 amperes.
Maximum load on 4—4 . . . . . 1000 amperes.
Average load on 4—4 . . . . . . 500 amperes.

The energy taken by the booster field coil 11 is not figured.

Example 1. Battery voltage equal to that of the line 4—4 viz., 500 volts. The generators connected and operating. The booster assists the dynamo to charge the battery and also assists the battery to discharge; it is therefore reversible. The C. E. M. F. generator 9 is designed and adjusted so that with 500 amperes on 4—4 its voltage will be 500, and being connected counter to 4—4 the resultant current through the booster field 11 will be 0. Thus the battery neither charges nor discharges. With 1000 amperes on 4—4 the voltage of the booster 8 must be such as to cause the battery to discharge at 500 ampere rate. Assuming that each of the windings 13 and 16 have the same number of turns, there are 1000 amperes through the winding 16, and 500 amperes through the winding 13, giving the equivalent of 1500 amperes through one of the windings, viz. 16. As with 500 amperes on 4—4 (equivalent to 1000 amperes through a single winding) the voltage of the C. E. M. F. generator 9 must be 500 volts, it follows that, assuming a straight line characteristic for the C. E. M. F. generator 9, 1000 amperes on 4—4, would give a voltage from the C. E. M. F. generator of 750. Therefore 250 volts are available for energizing the booster field. The booster 8 must therefore be so designed that with 250 volts on the coil 11 sufficient voltage is obtained from the booster to cause the battery to discharge at 500 ampere rate. With 0 amperes on the line 4—4, only the winding 13 is active and with 500 amperes battery charge through the winding 13 the voltage of 9 will be 250 volts in the opposite direction. This voltage is available for energizing the booster field, giving the booster 8 a voltage in a direction added to that of line 4—4, sufficiently great to cause the battery to charge at 500 ampere rate.

Example 2. The battery voltage greater than that of the line. Assume a battery voltage sufficiently high so that discharge at 500 ampere rate may be obtained from the battery without the assistance of the booster. The generators are connected and operating as before. Then with 1000 amperes on 4—4, the voltage of the C. E. M. F. generator 9 must be 500 volts opposed to the line voltage as in Example 1. The coil 11 will be neutral and the booster voltage 0, and the battery will discharge at the above stated rate of 500 amperes. With 500 amperes on 4—4 the booster voltage must be sufficient to prevent the battery either charging or discharging. With 0 amperes on 4—4 the voltage of 8 must be sufficient to cause the battery to charge at 500 ampere rate. If, as before, the coils 15 and 16 have the same number of coils and if, with 1000 amperes on 4—4 (the equivalent of 1500 amperes through one winding), the voltage of 9 is 500 volts, then with 0 amperes on 4—4 and the battery charging at 500 amperes, the voltage of 9 will be 166-2/3 volts. The voltage available for energizing the booster field coil 11 will therefore be 500—166-2/3 volts=333-1/3 volts. The booster field coil 11 therefore must be wound so that with this voltage—333-1/3 volts—on its terminals the booster voltage will be sufficient to cause the battery to charge at 500 ampere rate. With 500 amperes on 4—4 the voltage of 8 must be sufficient to prevent the battery from either charging or discharging. The voltage on the field coil 11 will be 166-2/3 volts, the difference between the line voltage of 500 and the C. E. M. F. voltage of 333-1/3 volts.

Example 3. Battery voltage less than the line voltage so that charging at 500 ampere rate may be effected without assistance of the booster. The generators connected and operating as before. In this instance with 0 amperes on 4—4 the voltage of the C. E. M. F. generator 9 must be 500 volts,—that is, equal to the voltage on 4—4 when the battery charges at 500 amperes. With 1000 amperes on the line 4—4 (coils 13 and 16 being assumed to have the same number of turns) the voltage of the C. E. M. F. machine 9 will be 1500 volts. The voltage available for energizing the field 11 will be 1500 volts — 500 volts = 1000 volts. The booster field 11 therefore must be so designed that with 1000 volts applied to its terminals, sufficient voltage is obtained from the booster 8 to cause the battery to discharge at 500 ampere rate. With 500 amperes on 4—4 the voltage on 11 will be 500 volts and this will give booster voltage sufficient to prevent the battery from charging or discharging.

These examples show that if the various parts of the system be properly proportioned the voltage of the battery may have any desired value relative to that of the line.

By increasing the amount of resistance in the rheostat 12 the amount of the load increases taken by the generators may be changed. If, for instance, the resistance of the rheostat 12 be infinite the generators take all the load increases, and the generator load varies exactly as the load on the line 4—4. If, on the other hand, the resistance of the rheostat 12 be zero the generator load may be maintained at constant value, irrespective of the fluctuations on the line 4—4. (Rheostat 12 may be any suitable energy absorbing device.)

By means of the end-cell switch S the battery voltage may be changed and the battery made to charge more than it discharges, or vice versa.

By increasing the relative number of turns in either of the coils 16 or 13 over the other the voltage available for energizing field coil 11 may be altered. For instance, in Example 1, if the coil 16 be assumed to have twice as many turns as coil 13 the voltage available for energizing the booster field coil 11 becomes 333-1/3 volts. If coil 13 be assumed to have twice as many turns as coils 16 the voltage available for energizing the booster field coil 11 becomes 166-2/3 volts. An effect similar to the changing of the relative number of turns in coils 13 and 16 may be obtained by means of the shunt resistances 15 and 17.

The characteristic of the counter E. M. F. generator 9 and also of the booster 8 may be made so that compensation for battery characteristic may be obtained.

The counter E. M. F. generator is a motor when its E. M. F. is lower than that of the source,—say the line 4—4; and is a generator when its E. M. F. is greater than that of the source, or line 4—4.

Having thus described my invention, what I claim as new therein and desire to secure by Letters Patent is:—

1. In a system of electrical distribution, the combination with a generator, a work circuit and a storage battery and booster in series relation connected to said circuit, of a source of E. M. F. counter to the E. M. F. of the system, means in the work circuit and responsive to the load thereon to cause said C. E. M. F. to vary proportionally with the load, and a circuit energized by the resultant of said opposing E. M. F's., and a booster field winding included in said circuit.

2. In a system of electrical distribution, the combination with generating means and a work circuit supplied therefrom, of a storage battery connected to said circuit, a booster in the battery connection, and a counter-electromotive force generator connected in circuit with the field magnet of the booster and a field coil for said counter-electromotive force generator in the work circuit and responsive to the load changes in said circuit and to the load on the generator.

3. In a system of electrical distribution, comprising a generator circuit, a work circuit and a storage battery and booster, a source of counter electro-motive force for controlling the booster field, and means in the work circuit and responsive to electrical changes therein and to the load on the generator for automatically regulating said counter-electromotive force.

4. In a system of electrical distribution comprising a generator circuit, a work circuit, and a storage battery and booster; means to control the booster field, said controlling means comprising a counter-electromotive force generator connected across the work circuit and having its field responsive to electrical changes in the battery circuit during battery discharge.

5. In a system of electrical distribution comprising a generator circuit, a work circuit, and a storage battery and booster; means to control the booster field, said controlling means comprising a counter-electromotive force generator connected across the work circuit and having its field responsive to electrical changes in the battery circuit and in the generator circuit during battery discharge.

6. In a system of electrical distribution comprising a generator circuit, a work circuit, and a storage battery and booster; means to control the booster field, said controlling means comprising a counter-electromotive force generator having its armature connected across the work circuit and its field responsive to battery discharge.

7. In a system of electrical distribution comprising a generator circuit, a work circuit, and a storage battery and booster; means to control the booster field, said controlling means comprising a counter-electromotive force generator having its armature connected across the work circuit and its field in the battery and generator circuits during battery discharge.

8. In a system of electrical distribution, the combination with a generator, a work circuit, a storage battery and booster in series relation connected to said circuit, a field winding for the booster, and a circuit including said field winding connected to the system to have a substantially constant E. M. F. in one direction therein, a source of opposing E. M. F. connected to said circuit, said opposing E. M. F. being directly dependent upon the load in the work circuit and electrical conditions in the battery and booster circuit.

9. In a system of electrical distribution, the combination with a work circuit, a storage battery, a booster connected thereto and a generator connected to said circuit, of a counter-electromotive force generator having its armature in series with the booster field winding, two field windings connected in series for said counter-electromotive force generator, one of said field windings in the generator circuit, and the other in the battery and work circuits.

10. A system of electrical distribution, comprising a work circuit, a storage battery and booster in series relation, and a generator connected to said circuit, a C. E. M. F. generator connected in parallel with the work circuit the C. E. M. F. of which is directly dependent upon the load in the work circuit and the battery discharge, and a field winding for the booster included in the circuit of the C. E. M. F. generator.

11. In a system of electrical distribution, the combination with a work circuit, a generator and a storage battery connected in parallel to the work circuit, a booster for regulating the battery action, of means for energizing the booster field magnet said means comprising a circuit connected to receive a substantially constant E. M. F. in one direction and including the booster field coil therein, a counter E. M. F. generator connected to said circuit whereby said circuit is energized by the resultant of said opposing E. M. F's., and means comprising a series coil in the work circuit for varying said resultant E. M. F. in response to the load on the work circuit.

12. In a system of electrical distribution; the combination with a work circuit, a storage battery and booster connected thereto, a generator for supplying said circuit, of means for controlling and regulating the booster, said means comprising a circuit connected to receive a substantially constant E. M. F. in one direction, and including therein the booster field winding, a source of counter E. M. F. connected to said circuit whereby said circuit is energized by the resultant of the opposing E. M. F's. and means for varying said counter E. M. F., said means comprising cumulatively acting coils for the counter E. M. F. generator, one of said coils in series in the work circuit and the other of said coils in series in the generator circuit.

13. In a system of electrical distribution, the combination with a work circuit, a generator and storage battery connected in parallel thereto and a booster for regulating battery action, of means for controlling the excitation of the booster field, said means comprising a circuit connected to receive a substantially constant E. M. F. in one direction, a counter E. M. F. generator connected to said circuit whereby said circuit is energized by the resultant of the opposing E. M. Fs., and means for varying said counter E. M. F., said means comprising cumulatively acting coils one of said coils in series with the battery discharge and the other of said coils in series with the generator.

14. In a system of electrical distribution, the combination with a work circuit, a generator and storage battery connected in parallel with the work circuit and a booster for regulating battery action, of means for energizing the booster field magnet, said means comprising a circuit connected to receive a substantially constant E. M. F. in one direction, a field winding for the booster included in said circuit, a counter electromotive force generator connected with said circuit and means for varying said counter electromotive force, said means comprising a coil common to the battery discharge circuit and the work circuit, and a coil in the generator circuit.

15. In a system of electrical distribution, the combination with a work circuit, a generator and storage battery connected in parallel with the work circuit and a booster for regulating battery action, of means for energizing the booster field magnet, said means comprising a circuit connected to receive a substantially constant E. M. F. in one direction, a field winding for the booster included in said circuit, a counter electromotive force generator connected with said circuit and means for varying said counter electromotive force, said means comprising a coil in the battery discharge circuit and a coil in the battery charging circuit.

16. In a system of electrical distribution, the combination of a work circuit, a generator and storage battery connected in parallel to the work circuit, a booster in series with the battery, branch circuits for the battery, one for discharge and the other for charge, means for energizing the booster field, said means comprising a circuit connected to receive a substantially constant electromotive force in one direction, a field winding for the booster in said circuit, a counter electromotive force generator in said circuit, two field windings for said counter electromotive force generator, one of said windings in the battery discharge circuit and the other of said windings in the battery charging circuit, both of said windings in series with the generator, whereby both of said windings are active under normal condition of the battery and one of said windings is inactive during battery charge.

17. In a system of electrical distribution comprising a generator circuit, a work circuit, and a storage battery and booster; means to control the booster field comprising a motor having its armature connected across the work circuit and including the booster field in said connection; the field of said motor in the battery circuit.

18. In a system of electrical distribution comprising a generator circuit, a work circuit, and a storage battery and booster; means to control the booster field, comprising a motor having its armature connected across the work circuit and including the booster field in said connection; the field of said motor in the battery and generator circuits.

19. In a system of electrical distribution, the combination with generating means and a work circuit supplied therefrom; of a storage battery and a booster connected to the work circuit, a counter electromotive force generator comprising an armature and a field magnet, connections from the armature of the counter-electromotive force generator to the field magnet winding of the booster, and connections to the field winding of the counter-electromotive force generator field winding, so that the strength of the field magnet is dependent on the current supplied by the dynamo to the line and that supplied by the battery to the line.

20. A system of electrical distribution, comprising a work circuit and translating devices supplied therefrom, a generator connected to the work circuit, a storage battery, provided with an end-cell switch, connected to the work circuit, a booster having its armature in the battery connection, a counter-electromotive force generator or motor having a field coil in the generator connection, said coil divided into sections and one of said sections included in the battery connection, the armature circuit of said counter-electromotive force generator including a field coil of the booster and an adjustable resistance or energy absorbing device, and adjustable shunt resistances for varying the effect of either or both sections of the field coil of the counter-electromotive force generator or motor.

21. A system of electrical distribution, comprising a work circuit, a generator and a storage battery connected in parallel therewith, a booster having its armature in the battery connection, and having its field connected to a source of approximately constant electromotive force, a counter-electromotive force generator or motor in circuit with the booster field, a field coil for the counter-electromotive force machine included in the generator connection, the battery and booster connection connected to an intermediate point in the field coil of the counter-electromotive force machine.

22. A system of electrical distribution comprising a work circuit, a generator and a storage battery connected in parallel therewith, a booster having its armature in the battery connection, and having its field connected to a source of approximately constant electromotive force, an adjustable resistance device in said booster field connection, a counter-electromotive force generator or motor in circuit with the booster field, a field coil for the counter-electromotive force machine included in the generator connection, the battery and booster connection connected to an intermediate point in the field coil of the counter-electromotive force machine.

23. A system of electrical distribution, comprising a work circuit, a generator and a storage battery connected in parallel therewith, a booster having its armature in the battery connection and having its field connected to a source of approximately constant electromotive force, an adjustable resistance device in said booster field connection, a counter-electromotive force generator or motor in circuit with the booster field, a field coil for the counter-electromotive force machine included in the generator connection, the battery and booster connection connected to an intermediate point in the field coil of the counter-electromotive force machine, and means for separately adjusting and controlling the sections of said field coil on either side of said intermediate point.

24. A system of electrical distribution, comprising a generator, a work circuit, storage battery and booster, said battery and booster connected to the work circuit to steady the load on the generator, a c. e. m. f. generator connected with the booster field, and means responsive to the load on the generator and to battery discharge for regulating the effect of the c. e. m. f. generator, and means for regulating the amount of load fluctuation reaching the generator.

25. A system of electrical distribution, comprising a generator, a work circuit, storage battery and booster, said battery and booster connected to the work circuit to steady the load on the generator, a c. e. m. f. generator connected with the booster field, means responsive to the load on the generator and to battery discharge for regulating the effect of the c. e. m. f. generator, means for regulating the amount of load fluctuations reaching the generator, and means for regulating the input and output of the battery.

ALBERT S. HUBBARD.

Witnesses:
L. LITTLEFIELD, Jr.,
EDWARD LYNDON.